Patented June 9, 1936

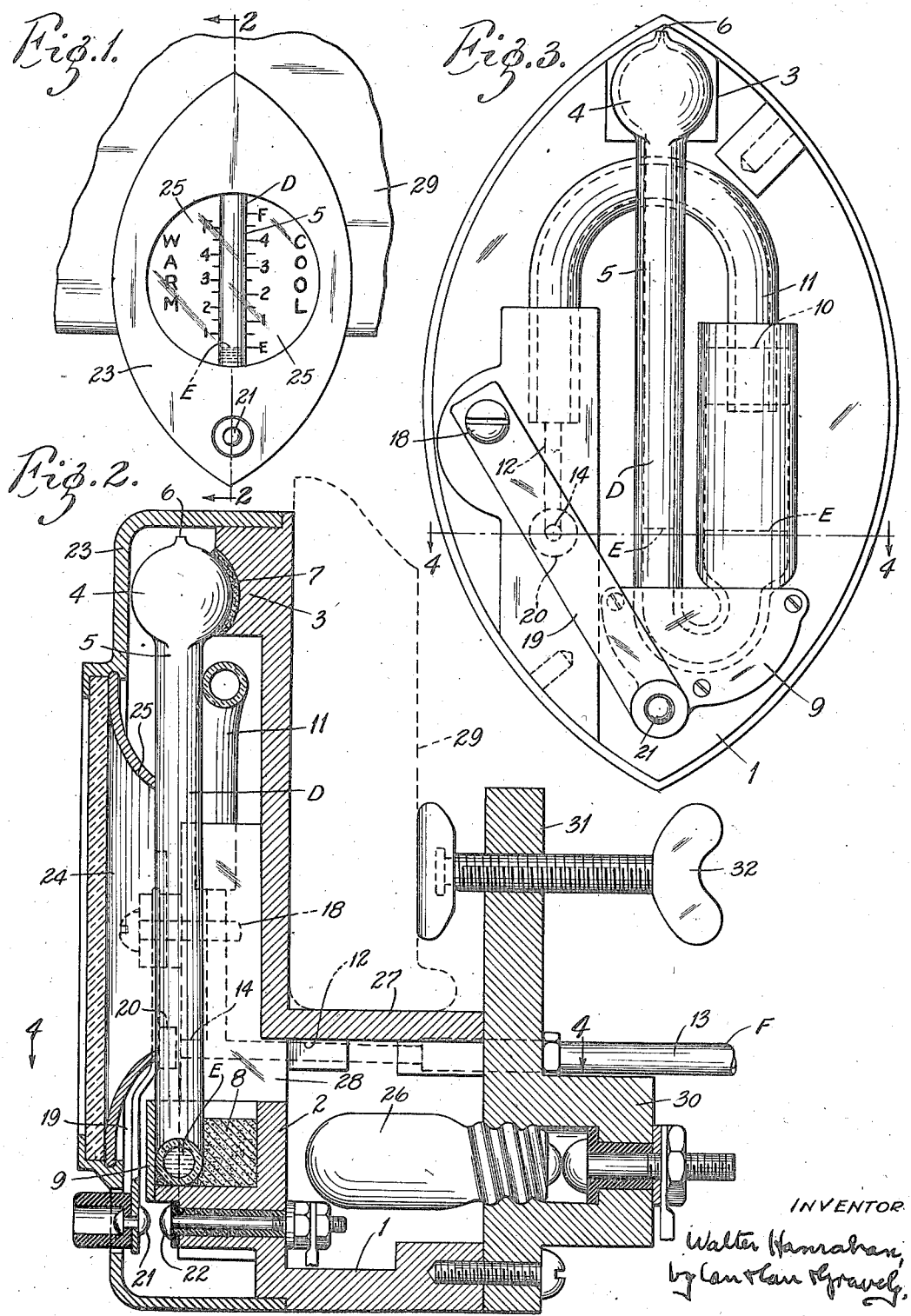

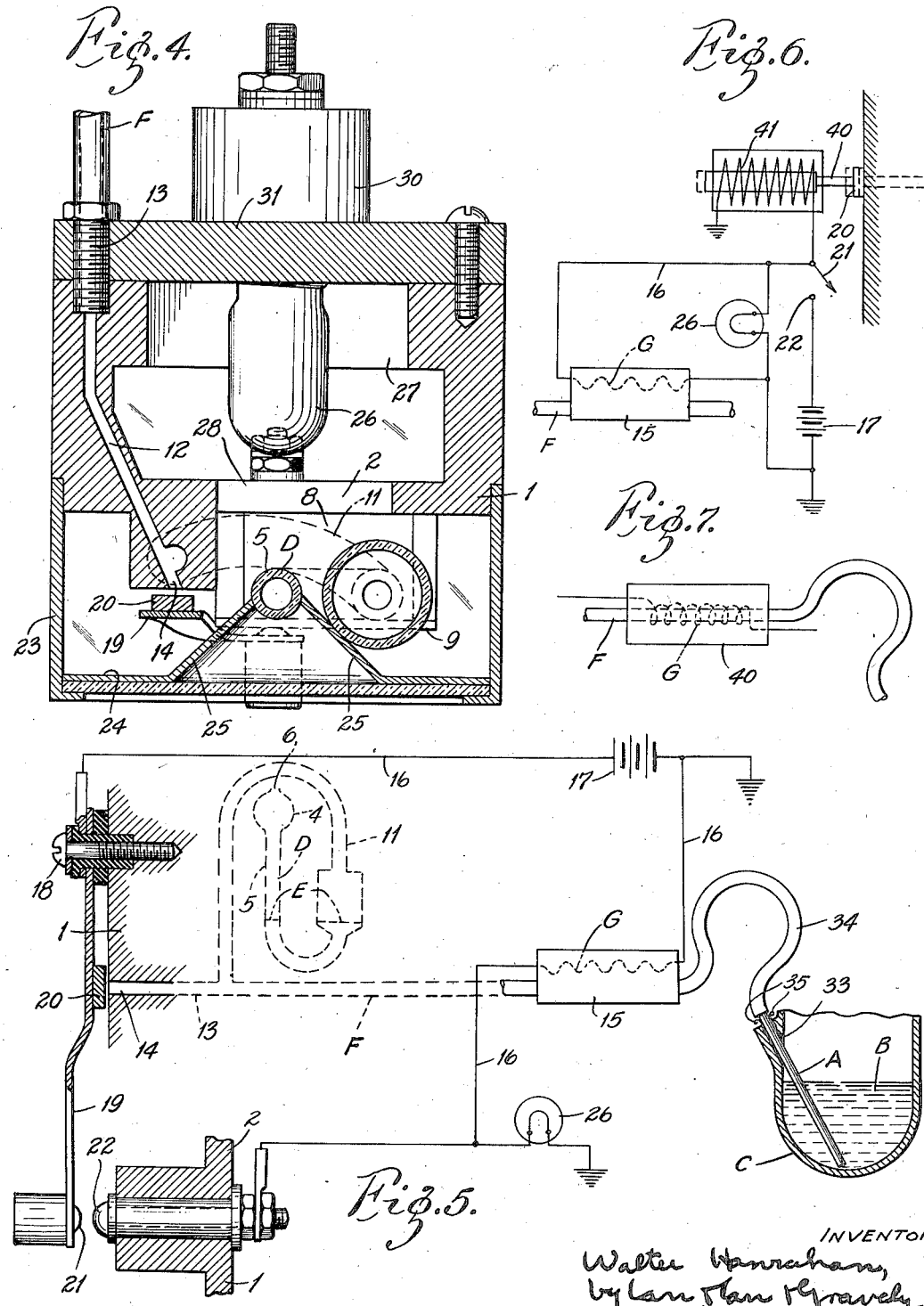

2,043,435

UNITED STATES PATENT OFFICE 2,043,435

LIQUID DEPTH GAUGE

Walter Hanrahan, St. Louis, Mo.

Application January 2, 1934, Serial No. 704,883

5 Claims. (Cl. 73—54)

My invention relates to the gauging of the depth of bodies of liquids, particularly to the gauging of such bodies of liquid as the oil contained in an automobile crank case. It has for its principal object a gauge that can be operated at will and that has its actuating mechanism and its indicator conveniently located at a point remote from the body of liquid, as on the dashboard of an automobile. Other objects are a gauge that is simple in construction and accurate in operation and that is very easily installed and used.

The invention consists principally in providing the pressure line of a liquid depth gauge of the pressure type, with a heatable member for creating the necessary pressure in the line. The invention further consists in the liquid depth gauge and in the parts and combinations and arrangements of parts hereinafter described and claimed.

In the accompanying drawings,

Fig. 1 is a front elevation of a liquid depth gauge embodying my invention,

Fig. 2 is an enlarged sectional view on the line 2—2 in Fig. 1,

Fig. 3 is a front elevation, on an enlarged scale, of the actuating and indicating mechanism, the cover being removed, Fig. 4 is a sectional view on the line 4—4 in Fig. 3, Fig. 5 is a diagrammatic view of the device including the wiring;

Fig. 6 is a diagrammatic view of a modification; and

Fig. 7 is a diagrammatic view of another modification.

Briefly stated, the liquid depth gauge illustrated includes a hollow tube A inserted into the oil B in an automobile crank case C and extending almost to the bottom thereof, a U-tube D containing some mercury E, oil or other suitable indicating material, a pressure line F connecting said U-tube D and said plunger tube A and an electric heating unit G in said pressure line, so that the gauging is accomplished by passing a current through said heating unit G, thereby expelling the liquid from the plunger tube A and causing the columns in the U-tube D to assume a position dependent upon the depth of the liquid being gauged, A housing 1, which supports the indicating and actuating mechanisms, is provided with a boss 2 at its lower end in which is a concave seat for said U-tube, and with a boss 3 at its upper end having a concave seat for the enlarged spherical head 4 of one arm 5 of said U-tube D. Said head has an outlet 6 to the air. Preferably, a felt or other suitable insulating cushion 7 is interposed between said boss 3 and said head 4. A suitable packing material 8 may be placed around the lower end of said U-tube and a plate 9 covers the front end of said seat to hold the tube D in position.

In one end of said U-tube D is a plug 10 through which extends the end of a tube 11 that communicates with a passageway 12 through said housing. Said passageway 12 communicates with a tube 13 forming part of the pressure line F that leads to the plunger tube A. An auxiliary passageway 14 leads to the face of said housing, so that said U-tube D and said pressure line F are open to atmospheric pressure.

In the pressure line F is an enlarged chamber 15 in which is mounted the heating unit G, which is illustrated as being an electric heater.

The heating unit G is connected by suitable wiring 16 to the automobile battery 17 or other source of electric current. Pivotally mounted in the supporting housing, as by a screw 18, is a flexible arm 19 that is provided with a valve member 20 adapted to cover the end of said auxiliary passageway 14 and with a contact member 21 adapted to engage a contact member 22 mounted on the housing. Said contact members are arranged in the electric circuit of the heating unit G so as to constitute the switch therefor.

Obviously, pressing said arm 19 so as to close said switch 21—22 closes the circuit through the heating unit G and at the same time closes the end of the auxiliary passageway 14. The heating of said unit G will build up pressure in the pressure line F and operate the gauge. As soon as the reading has been taken the switch 21—22 is opened, which opens the by-pass 14 and permits the restoration of atmospheric pressure in the air pressure line F.

The housing 1 is provided with a suitable cover 23 in which is a face plate 24 provided with inclined faces 25 whose edges extend along a portion of the U-tube. Preferably, each face 25 has a set of graduations, those of one set being at a lower level than the corresponding graduations of the other set, so as to provide for a correct reading when the automobile is in use as well as when it has been standing idle. After the automobile has been standing it will be realized that the oil drains out of the motor into the crank case so that the level in the crank case will stand slightly higher than after the motor has been running and oil fed to the working parts thereof.

In order to make the reading easier, an electric bulb 26 may be placed in a nosing 27 projecting from the supporting housing 1, a slot 28 being provided in the wall of said housing to permit illumination of the U-tube. Said bulb is placed in the heating unit circuit.

In order to secure the device to an automobile dash-board 29 or the like a cap 30 may be placed over the end of said nosing 27 and provided with an upstanding portion 31 in which is mounted a thumb screw 32 so that the dash-board may be engaged between the back of said supporting housing 1 and said thumb screw 32.

The plunger tube A may be inserted into the crank case opening 33 wherein a measuring rod is customarily mounted. Said tube may be marked with the usual graduations and the tube 34 to which it is connected may be flexible, so as to permit hand gauging when desired.

In the modification shown in Fig. 6, the valve 20 for the auxiliary passageway is mounted on the armature 40 of a solenoid 41 which is in the same circuit as the heating unit. Closing the heating unit switch 21—22 energizes the solenoid and causes the valve to be closed.

Fig. 7 indicates a modified arrangement of heating unit intended for use where the liquid being measured is inflammable, as gasoline. In this arrangement, the heating unit G is placed on the outside of the pressure line F and a suitable casing 40 is placed over it.

The above described liquid depth gauge has important advantages, since it is easily installed, accurate in operation and simple in construction. Obviously, numerous changes may be made without departing from the invention and I do not wish to be limited to the precise construction shown.

What I claim is:

1. A liquid depth gauge comprising an indicator, a hollow tube adapted for insertion into a body of liquid to be measured, a pressure line connecting said tube and said indicator, a heatable member in said pressure line, said pressure line having a by-pass opening and means for simultaneously closing said by-pass opening and causing said heatable member to be heated.

2. A liquid depth gauge comprising an indicator, a hollow tube adapted for insertion into a body of liquid to be measured, a pressure line connecting said tube and said indicator, an electric heating member in said pressure line, said pressure line having a by-pass opening, a source of electricity for said heating member, a switch for controlling the electric circuit, and a member for simultaneously closing said switch and said by-pass opening.

3. A liquid depth gauge comprising a housing having a boss in its lower portion provided with a concave seat in its upper surface and a boss in its upper portion provided with a concave seat in its front face, a U-tube seated in said lower boss, one arm of said U-tube having a spherical head resting in said concave seat of said upper boss, a cover for said housing, a passageway extending through said housing and opening into a pressure line, an auxiliary passageway opening through said housing, a tube connecting said passageway and the other arm of said U-tube, a graduated scale extending along a portion of said U-tube, a plunger tube extending into the liquid to be gauged and connected with said pressure line, an electric heating unit disposed in said pressure line, a source of electric current for said heating unit, an arm pivotally mounted in said housing adjacent to the open end of said auxiliary passageway and provided with a push button and with a closure for said auxiliary passageway, an electric contact member on said arm and a second electric contact member in said housing, said contact members being in the circuit for said heating unit.

4. A liquid depth gauge comprising a housing having a boss in its lower portion provided with a concave seat in its upper surface and a boss in its upper portion provided with a concave seat in its front face, a U-tube seated in said lower boss, one arm of said U-tube having a spherical head resting in said concave seat of said upper boss, a cover for said housing, a passageway extending through said housing and opening into a pressure line, an auxiliary passageway opening through said housing, a tube connecting said passageway and the other arm of said U-tube, a nosing projecting rearwardly from said housing, an electric light bulb in said nosing, a graduated scale extending along a portion of said U-tube, said housing being provided with an opening to permit said bulb to illuminate said U-tube, a plunger tube extending into the liquid to be gauged and connected with said pressure line, an electric heating unit disposed in said pressure line, a source of electric current for said heating unit and light bulb, an arm pivotally mounted in said housing adjacent to the open end of said auxiliary passageway and provided with a push button and with a closure for said auxiliary passageway, an electric contact member on said arm and a second electric contact member in said housing, said contact members being in the circuit for said light bulb and heating unit.

5. A liquid depth gauge comprising a housing, an indicator mounted in said housing, a hollow tube adapted for insertion into a body of liquid to be measured, a pressure line connecting said tube and said indicator, an electric heating member in said pressure line, said pressure line having a by-pass opening through said housing, an electric circuit for said heating element, an arm movably secured to said housing, a valve for said by-pass opening on said arm and an electric switch member on said arm, whereby said arm may be moved to simultaneously close said by-pass and close the circuit for said electric heating element.

WALTER HANRAHAN.